United States Patent
LeVasseur (10) Patent No.: US 6,457,847 B1
(45) Date of Patent: *Oct. 1, 2002

(54) LIGHTING SYSTEM EMPLOYING GLASS BLOCK LENS

(75) Inventor: Craig LeVasseur, Westlake Village, CA (US)

(73) Assignee: Cooper Technologies, Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/567,957

(22) Filed: May 9, 2000

Related U.S. Application Data (60) Provisional application No. 60/133,469, filed on May 10, 1999.

(51) Int. Cl.⁷ ................................................. F21V 11/00
(52) U.S. Cl. ........................ 362/351; 362/147; 362/311; 362/362; 362/367; 362/431; 362/579
(58) Field of Search .................................. 362/351, 145, 362/152, 153.1, 311, 355, 362, 367, 410, 414, 431, 31, 339, 330, 576, 559, 551; 52/28

(56) References Cited

U.S. PATENT DOCUMENTS

| | | | |
|---|---|---|---|
| 4,358,306 A | * 11/1982 | Okamoto et al. | 65/102 |
| 4,438,484 A | * 3/1984 | Winden | 362/267 |
| 4,887,404 A | 12/1989 | Saji et al. | |
| 4,951,181 A | 8/1990 | Phillips | |
| 4,969,282 A | 11/1990 | Eberhart | |
| 5,333,427 A | * 8/1994 | Uhlik | 52/306 |
| 5,448,864 A | 9/1995 | Rosamond | |

* cited by examiner

Primary Examiner—Stephen Husar
Assistant Examiner—Bertrand Zeade
(74) Attorney, Agent, or Firm—John E. Wagner; Robert C. Smith (57) ABSTRACT

A decorative lamp fixture includes a housing with a generally rectangular cross-section formed of a pair of identical interlocking extruded members. An opening or window is formed on each side of the housing. The housing includes a plurality of internal grooves or channels for holding fasteners supporting a bracket which secures a glass block in position, such that its face surfaces are adjacent or protrude slightly from the openings. A lamp is positioned within the housing such that it directs light at an edge of the glass block. Other edges of the glass block are coated with a light reflecting coating, such as white paint. The housing includes a cover, and the lamp may be secured to the cover, or it may be positioned below the glass block.

18 Claims, 8 Drawing Sheets

LIGHTING SYSTEM EMPLOYING GLASS
BLOCK LENS

REFERENCE TO RELATED APPLICATION

This non-provisional application is based upon provisional Ser. No. 60/133,469 filed May 10, 1999, and hereby claims the benefit of the filing date thereof.

BACKGROUND OF THE INVENTION

It has been over fifty years since the structural glass block and glass bricks became popular as an architectural feature in residences and commercial and industrial structures.

The glass blocks characteristically have an ornamented interior wall to each face. The ornamentation typically is in the form of ribs, or grids, or other ornamental designs. These provide an attractive appearance, particularly with sunlight streaming through the double layer of patterns. They also provide sufficient distortion so that the blocks may be used to provide a degree of privacy, for example, for bathroom wall use.

The edges of the faces of the glass blocks typically have a partial, circular, cross section extending slightly above the surface of the rest of the wall to provide some light diffusion across the face of the wall. The actual edge of the block or brick is usually recessed slightly and sandblasted or otherwise roughened to provide a good bonding surface for conventional masonry mortar.

The glass block is hollow, as mentioned above, and in the process of manufacture is sealed with a moisture-free, atmosphere-free, sealed interior. The many year development of glass blocks and bricks has produced a myriad of styles from the simple unornamented, nearly undistorted, transmission versions to complex designs. Despite the variety of blocks and bricks available, the costs remain measured in just a few dollars each.

BRIEF DESCRIPTION OF THE INVENTION

For years, I have designed exterior architectural lighting fixtures and have faced and solved the problems in each fixture of designing an effective housing, lamp socket and mount, and lens assembly, as well as meeting any other requirements. The sealing of the fixture from moisture entrance has often been the most difficult problem, while allowing for easy relamping or other servicing of the fixture.

It appeared to me that the variety of standard glass blocks or bricks as they stand provide:

a) a sealed rugged lens;
b) internal patterns for light dispersion over two generally semi hemispherical patterns;
c) come in a wide variety of patterns and some colors;
d) include a built in diffuser and ideal surfaces as internal reflector.

Given these inherent features of glass blocks and bricks, I have invented a number of embodiments of novel lighting fixtures which employ glass blocks in combination with housings, lamp sockets and mounts, that produce remarkable lighting features, particularly valuable for walkway lighting.

In a first embodiment, a generally rectangular cross section bollard or post has a depth corresponding to the thickness of a glass block to be used as the lens of a walkway light. The bollard includes a hollow interior, at least in the region intended for light emission. A glass block is mounted within the bollard with its faces exposed on opposite sides of the bollard. A light source is located within the bollard exposed to one sidewall of the glass block. A socket and suitable cabling are also located in the bollard for mounting and powering the light source.

The normal sandblasted surface of each edge of the glass block, other than the edge surface directly exposed to the light source, is preferably painted or otherwise coated with a reflective coating, such as white paint, to provide a surface for reflecting any light energy reaching that side wall. Multiple reflections within the glass block produce a relatively uniform pattern and intensity of the light emitted from the two faces of the glass block whenever the light source is illuminated.

Each face of the glass block naturally produces a generally hemispherical pattern in the case of a square block and semi ellipsoidal or generally a semi egg-shaped pattern in the case of a rectangular glass block.

Various patterns are available for desired decorative effect.

BRIEF DESCRIPTION OF THE DRAWING

This invention may be more clearly understood from the following detailed description and by reference to the drawing in which:

FIG. 18 is a perspective view of a wall mounted fixture series in accordance ,with this invention showing a typical horizontal light-distribution pattern;

DETAILED DESCRIPTION OF THE INVENTION

Figure 1:
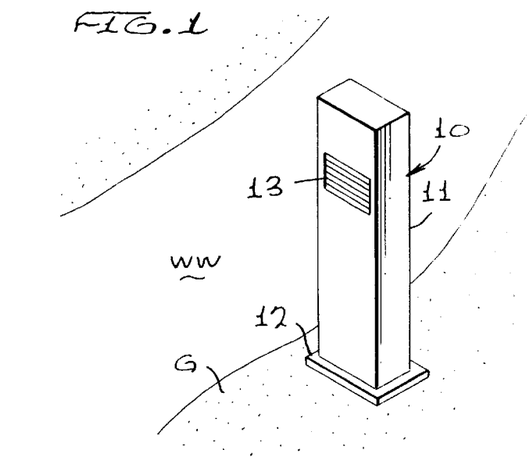
FIG. 1 is a perspective view of a bollard type exterior walkway lighting fixture employing a glass block as the lens of the fixture and which is positioned beside a walkway.

A typical walkway scene for use of this invention is illustrated in FIG. 1, with a hard surface walk WW extending through a landscaped area of grass G or garden bed. The walkway WW requires lighting for its safe use at night. Typically, this is accomplished by a series of fixtures located beside the walkway powered by underground conduits from a power supply. Often the lighting systems are of low voltage, e.g., 12 v AC but sometimes by standard household supplies 115 V. AC. In some other cases, the walkway lighting is powered by solar cells and rechargeable batteries.

Regardless of the type of power source to be used, there is a need to provide illumination along the walkway WW in both directions, either continuously or at sufficient intervals, to define a path for the user. In certain cases, there is a need to provide directional information as well, as in the case of a fork in a walkway. A typical application is in a resort where guests must find their accommodations or return to them after dark.

From the standpoint of the property owner, the lighting fixture should be attractive, adding to the landscape or being unobtrusive, yet effective, free from maintenance, and reasonable in cost.

Each of these objectives is achieved in accordance with this invention as illustrated in FIGS. 1–7. In FIG. 1, a generally rectangular bollard-type fixture, generally designated at 10, is shown, including a housing 11 mounted on a base 12 and having a thickness which approximates the thickness of a standard glass block or brick 13. The glass block 13 shown, itself is a rectangular hollow block having walls in the order of ⅜ inch in thickness with a pair of generally flat, exterior faces often with slightly elevated smooth curved edges.

Usually the interior of the glass block has ornamented surfaces of molded in patterns with multi levels or thickness of the face walls. The ornamentation is visible to the viewer looking at the surface of the glass block or through it to see the combination of the visual effects of both faces. Often, the viewer may see objects which are located on the opposite side of the glass block depending upon the clarity of the glass and the degree of ornamentation present on its interior. Examples of suitable glass block designs for use in this invention are shown and described below. In the example of FIG. 1, the glass block lens has horizontal interior ribs or striations on the inner surface of the glass block 13.

Figure 2:
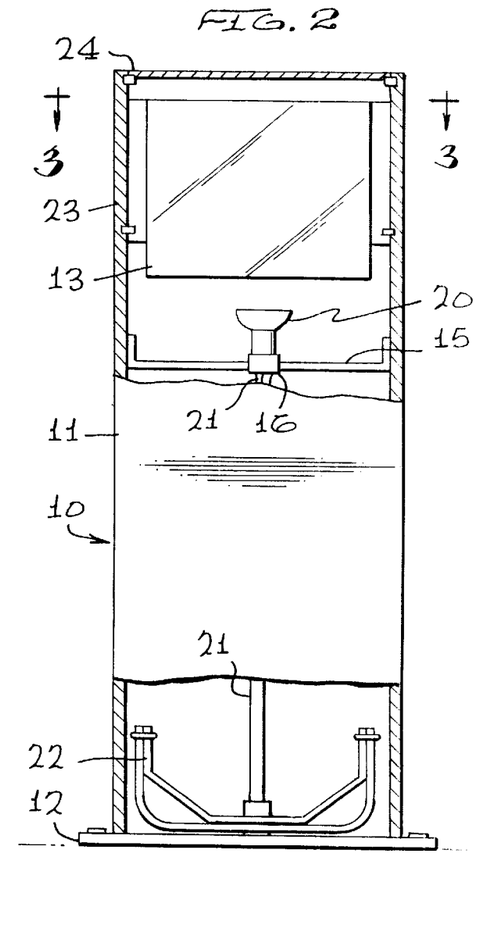
FIG. 2 is a front elevational view of the lighting fixture of FIG. 1 with portions broken away to show the interior.
Figure 3:
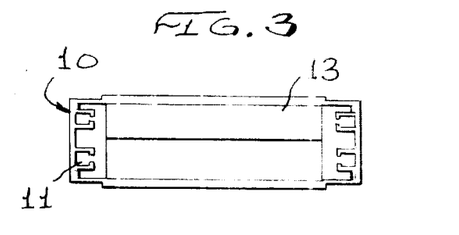
FIG. 3 is a horizontal sectional view of the fixture of FIGS. 1 and 2, taken along lines 3—3 of FIG. 2.
Figure 4:
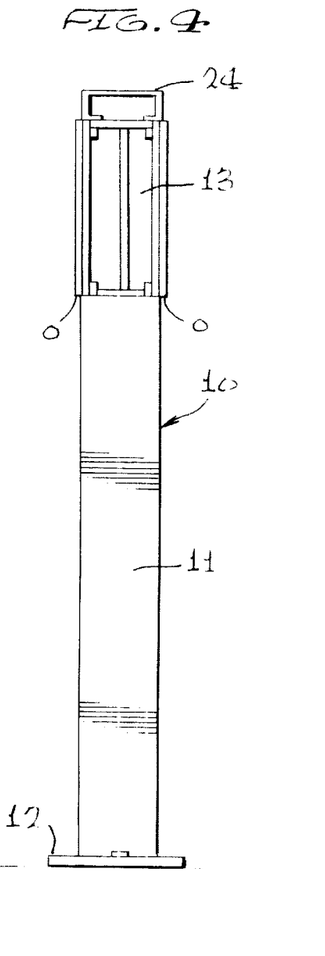
FIG. 4 is a side elevational view of the fixture of FIG. 1 with a portion broken away to show the glass block lens.

Now referring specifically to FIGS. 2–4, the fixture 10 of FIG. 1 is shown as a hollow, extruded, aluminum housing 11 on base 12, with a pair of openings O in major faces of the housing to receive a glass block 13. The housing 11, which is shown in section in FIG. 3, has a depth which approximates the thickness of the glass block 13 that has been selected for use. As shown in FIG. 4, the glass block 13 extends slightly beyond the faces of the housing 11 to allow some of the light emerging from the glass block 13 to illuminate the area around the base of the fixture 10.

The glass block 13 is secured within the housing 11 by a bracket 14, only a small portion of which appears in FIG. 2 since the bracket rests in the lower edge recess of the glass block 13. The bracket 14 is secured by fasteners which engage the internal integral fastener grooves shown in FIG. 3. After mounting the glass block 13 it is sealed to the openings in the housing 11 by suitable sealants, such as a transparent silicone sealer.

Positioned below the glass block 13 within the housing 11 is a lamp-mounting bracket 15, secured to the inner side of the housing 11 and mounting a socket 16 and lamp 20. For purpose of illustration, the lamp illustrated in FIG. 2 is a metal halide PAR-20 lamp, although the lamp selected will vary with the fixture size, location and the requirements of the glass block utilized.

The lamp 20 is directed toward the adjacent edge of the glass block 13, which characteristically is a diffusing surface since it normally arrives sandblasted for good bonding when installed in a masonry wall. The sandblasted surface acts as a diffuser to introduce the light from lamp 20 into the glass block. The remaining three edge-sandblasted surfaces of block 13, the sides and the top, are coated with a reflective coating, such as white paint, to provide three internally reflecting surfaces, and thereby enhance the illumination level exiting from the two major faces of the glass block 13. The power for the lamp 20 is supplied over cable or conductor within a conduit 21.

The housing 11 is secured to the base 12 by a bracket 22, which may also act as the entry point for underground power to the fixture 10. The housing 11 is closed at its top by a cover plate 24 which provides access for changing the block 13, if desired, or to replace lamp 20 when needed.

Figure 5:
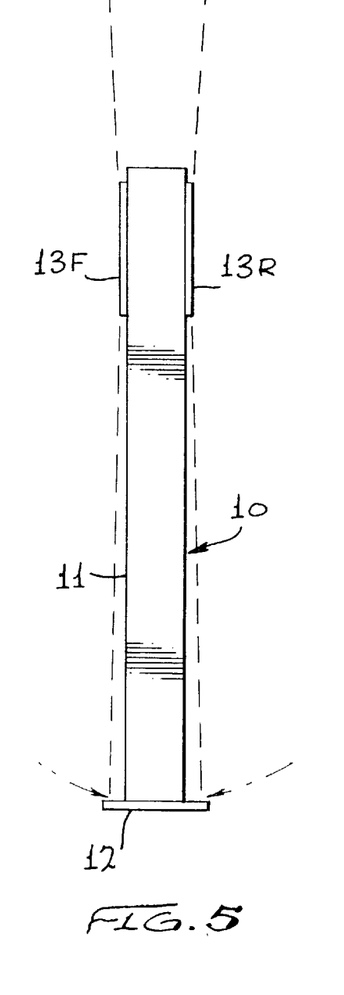
FIG. 5 is a side view of the fixture of FIGS. 1 and 2 showing the vertical light-distribution pattern for the lighting fixture of FIGS. 1 and 2.
Figure 6:
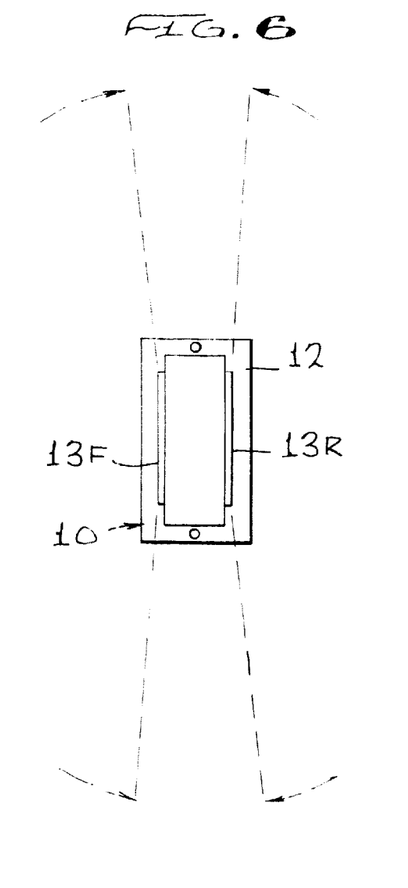
FIG. 6 is a horizontal, light-distribution pattern for the lighting fixture of FIGS. 1 and 2.

FIGS. 5 and 6 illustrate typical light distribution patterns for. the fixture 10 in the vertical (FIG. 5) and horizontal (FIG. 6) planes. The patterns and light levels are determined by the lamp and glass block and its pattern selected. For example, a ribbed pattern glass block 13R, as illustrated below can change the vertical versus horizontal patterns by change of orientation from vertical to horizontal rib orientation. This is easily accomplished when the openings O and the glass block 13 are square.

FIG. 5 illustrates that near 90 degrees of coverage in the vertical plane is provided on each face of the fixture 10, which is desirable for walkway illumination. In the horizontal plane as shown in FIG. 6, nearly 180 degrees of coverage is provided from each face constituting nearly 360 degree illumination.

Figure 7:
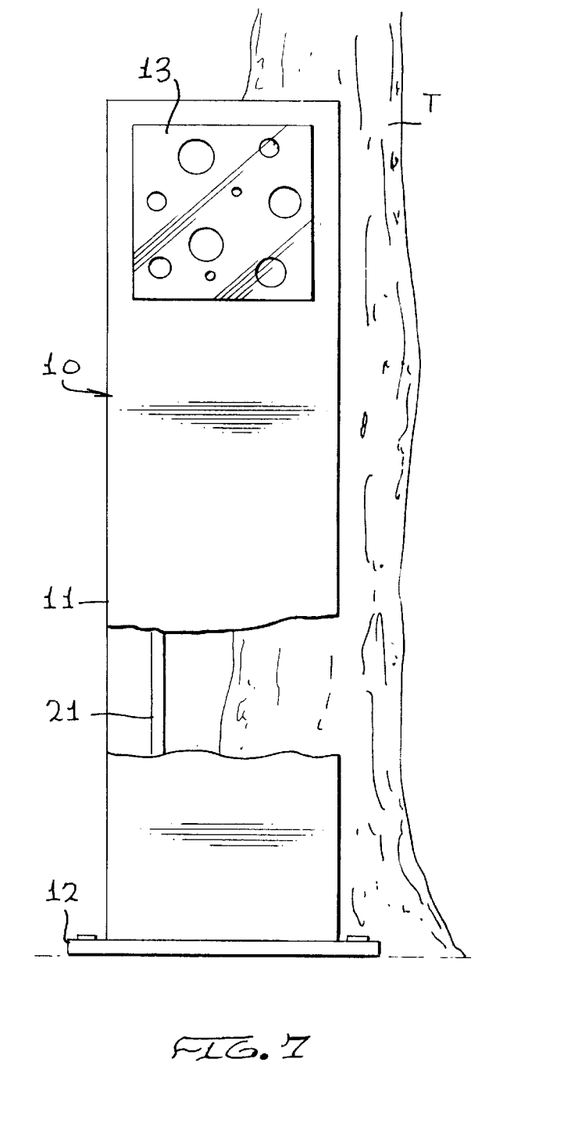
FIG. 7 is a front elevational view of the lighting fixture of FIGS. 1 and 2 shown in front of a tree showing the interior ornamental pattern and the partial transparency of the glass block lens region of the lighting fixture.

The fact that the use of glass blocks as the lens for a fixture affords an additional advantage is illustrated in FIG. 7. The fixture.10 is partially transparent in the illuminated area. of the glass block 13. The ornamentation of the internal surfaces of the glass block 13 is visible to the observer, and the viewer also has a view of the environment beyond the fixture 10. In this case, the vegetation, namely the tree T, is partly visible through the glass block. To this extent, at least, the fixture enhances the environment. This effect can be enhanced further by surface treatment of the housing 11, such as powder coating or anodization, to a color which fits in well with the environment.

Figure 8:
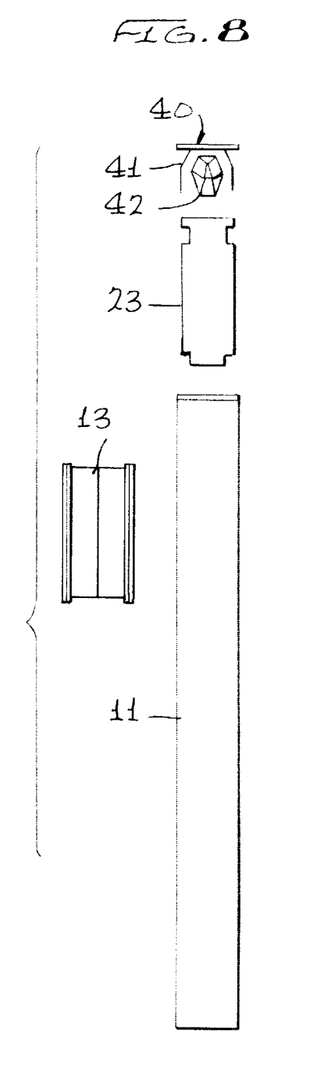
FIG. 8 is an exploded side elevational view of an alternate embodiment of this invention employing a top mounted compact fluorescent lamp assembly.
Figure 9:
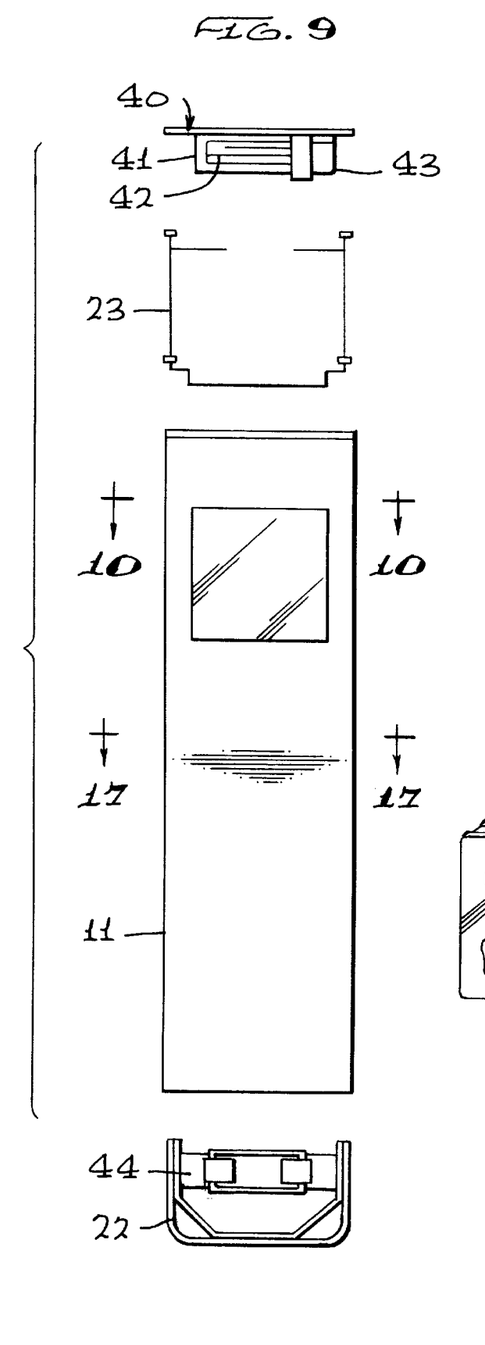
FIG. 9 is an exploded front elevational view of the lighting fixture of FIG. 8 showing its ballast and its mount exploded from the bottom of the housing.
Figure 10:
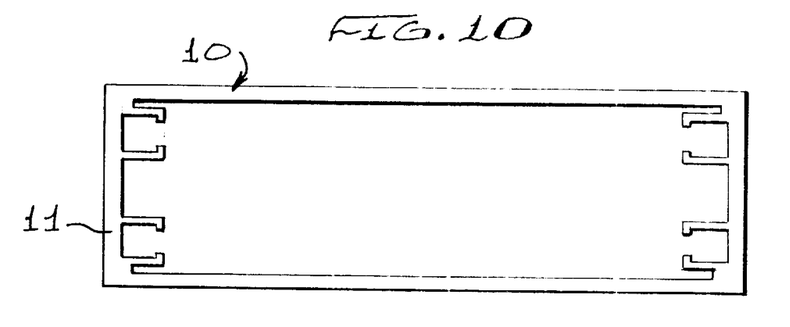
FIG. 10 is a horizontal sectional view of the housing extrusion of the. fixture of FIG. 9, taken along line 10—10 of FIG. 9.

Reference is now hereby made to FIGS. 8 and 9 for an alternate embodiment of this invention in which a different light source is used, and it is mounted above the glass block 13. In this embodiment, components common to the previous embodiment are given the same reference numerals for ease of understanding.

In this case, a compact fluorescent lamp assembly 40 includes a metal reflector 41, and a three U-lamp combination is mounted on or just below the top closure of the housing 11. It may be attached to the bracket 23, which also acts as the holder for the glass block 13. Any transformer or ballast need for the fluorescent lamp assembly is shown as component 44 mounted on bracket 22. Employing this embodiment, to change a lamp only requires opening the cover, lifting the lamp assembly 40 out of the housing 11 on the free length of cable 21, and removing and replacing the lamps 42 in the lamp socket 43. Next, the housing closure is replaced. To exchange a ballast or transformer 44, the housing 11 is removed from the base, unshown.

The housing 11 of the embodiment of FIGS. 8 and 9 is in the form of a simple rectangular cross section extrusion with four internal nut capture grooves, which are used to secure mechanical assemblies, such as the brackets 22 and 23, to the housing at any place along the length of the housing. These internal nut capture grooves eliminate the need for any undesirable fasteners or openings in the exterior walls of the fixture 10.

For an understanding of the variety of effects available with this invention, reference is now made to FIG. 13a in which three different patterns are shown. In FIG. 13a, a free form interior surface on each face is present in block 13a giving a cloud effect. In block 13b, the faces are clear with an internal directional arrow to convey information as well as illumination. In block 13c internal horizontal grooves providing radiation pattern control in the vertical direction, ideal for walkway illumination.

Figure 12:
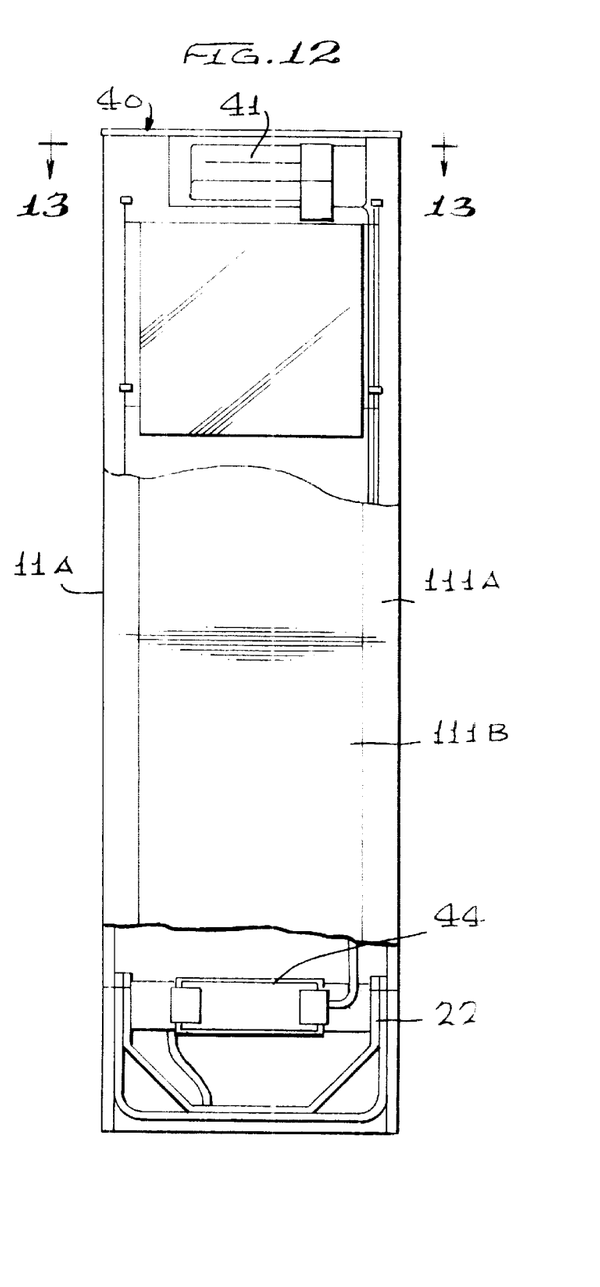
FIG. 12 is a front elevational view partly broken away of the fixture of FIG. 11.
Figure 14:
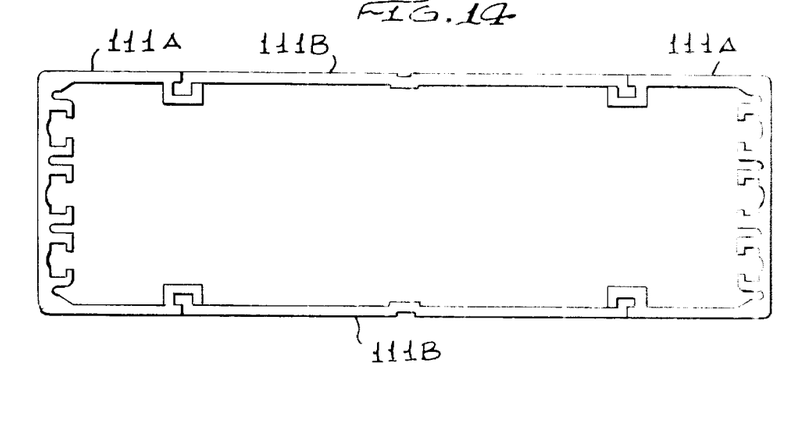
FIG. 14 is an enlarged end sectional view of one form of extrusion for forming the housing of the fixtures of this invention.

The advantages of the use of extrusions for the housing 11 is further illustrated in FIG. 14. In this case, the housing is made up of four interlocking parts, the cross section of which is best seen in FIG. 14. In FIG. 12, the only detectable difference from the previous embodiments is the seam line between the edge parts at the side edges of the glass block 13. As shown in FIG. 14, the edges of the housing are extruded as parts 111A and the central section making up the major faces of the housing 111 is provided by parts 111B. The parts 111A and 111B have mating edge grooves in the parts 111A and tabs in the parts 111B for longitudinal sliding engagement. The extruded parts 111B may be made in a variety of widths, each one to accommodate a different width of glass block 13. No cutting of openings in the face of the housing 11 is required to provide an opening for the glass block 13. The parts 111B are selected in width to match the glass block lateral dimension and then the parts 111B for each side are cut to the length of the parts 111A, less the vertical height of the glass block 13.

Figure 11:
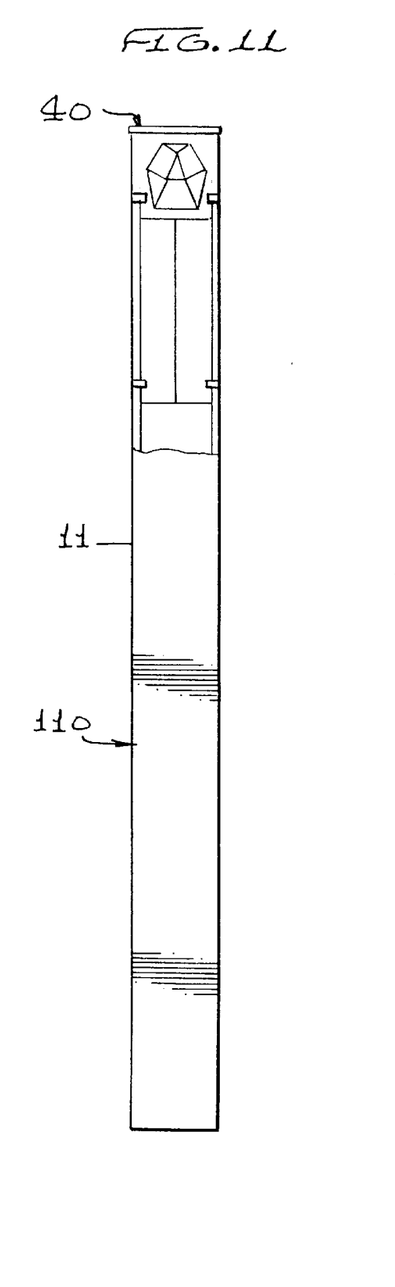
FIG. 11 is a side elevational view partly broken away of another embodiment of this invention in which the housing is a single extrusion. and a top mounted compact fluorescent lamp assembly is employed.
Figure 13:
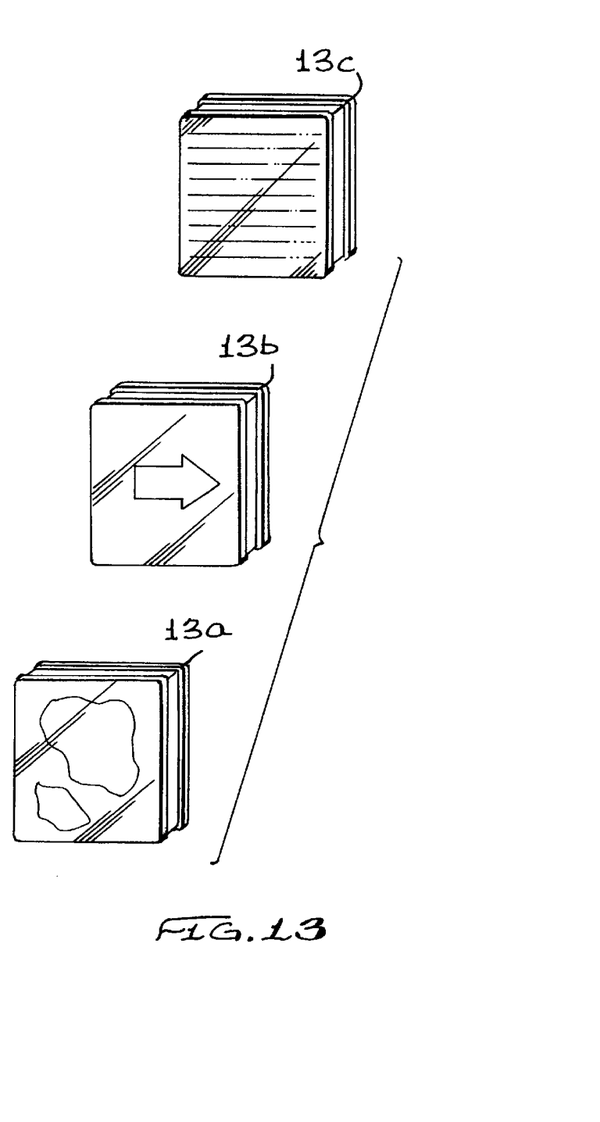
FIGS. 13a, 13b and 13c are front perspective views of alternate glass block designs usable in the fixture of FIGS. 11 and 12.
Figure 15:
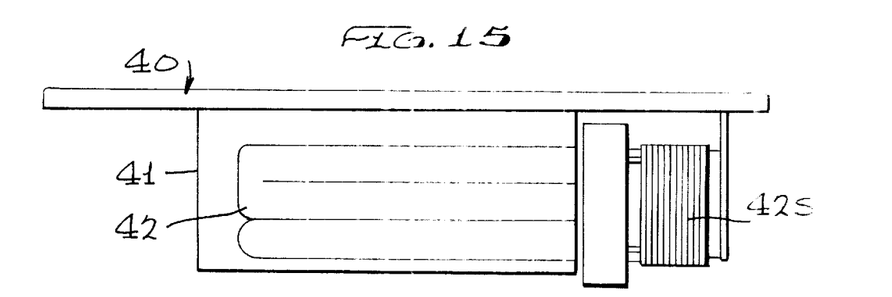
FIG. 15 is an enlarged side elevational view of a compact fluorescent lamp assembly of the type shown in FIGS. 8, 9, 11 and 12.
Figure 16:
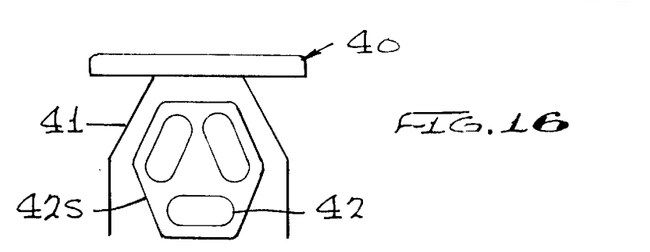
FIG. 16 is an end elevational view of the compact fluorescent lamp assembly of FIG. 15.

FIGS. 15 and 16 show in more detail the light source assembly 40 of the fixture of FIGS. 8 and 9, and the embodiment of FIGS. 11, 12 and 13 in which the lamp assemblies 40 are mounted above the glass block with their ballasts 44 separately mounted toward the bottom of the housings 11 and 111.

Figure 17:
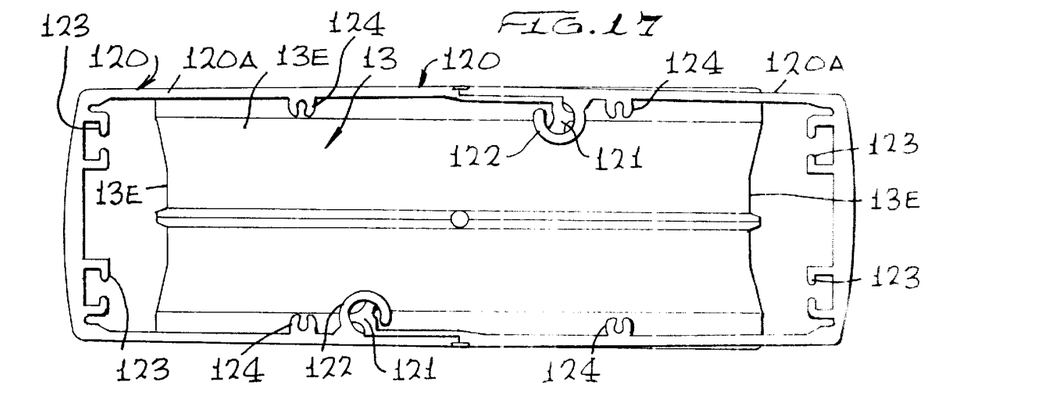
FIG. 17 is an enlarged transverse sectional view of an extruded two-part housing for use in this invention with a glass block in place.
Figure 19A:
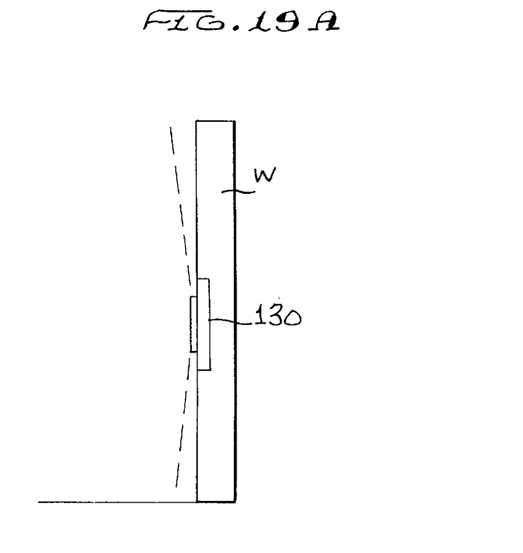
Figure 19B:
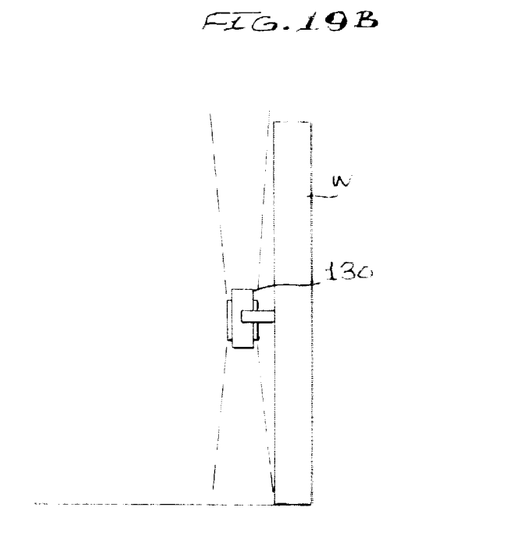
Figures 20A, 20B:
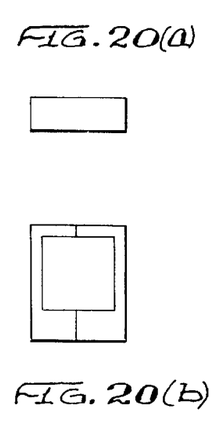
FIGS. 20–23 are a series of front elevational views of a variety of shapes and sizes of housings in accordance with this invention with the top plan view 20a–23a of each shown above the front elevational views 20b–23b, respectively.

Further utilization of the capabilities of extrusion technology in forming the housing 11 of this invention is illustrated in FIG. 17. In this case, the housing 120 is formed from two identical extruded parts 120, each with one Y-shaped rib 121 and one partial tubular section 122. These two parts 120A interlock to form a generally rectangular cross section housing 120. Also formed in each extrusion part 120A are the nut capturing grooves 123 and the screw capturing grooves 124. The grooves 123 position nuts which are used to secure the brackets for the glass blocks 13 and any ballast while the grooves 124 are used for receiving self tapping screws which hold the lamp assemblies or separate covers in place.

The edges of a typical glass block 13 may also be best seen in FIG. 8. The slight recess in the edges forms a channel for receiving the bracket 23 of FIGS. 8. Each of the edge surfaces, except the surface which is exposed to the light source, is rendered reflective as by a coat of white paint or a metallic reflective surface coat.

Figures 21A, 21B, 22A, 22B:
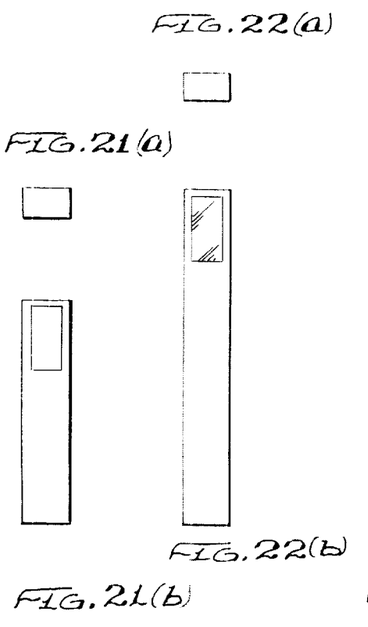
Figures 23A, 23B:
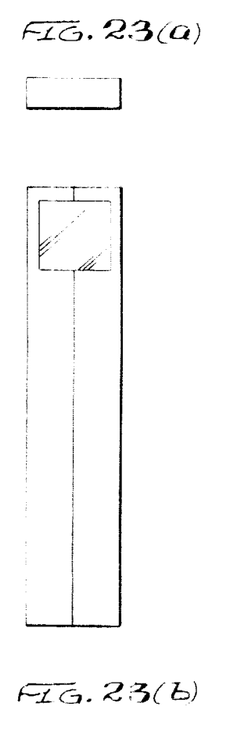

Samples of various freestanding bollard-type fixtures of this invention are shown in FIGS. 20–23 in four different heights and two different widths. The shortest form, FIG. 20a and 20b, and the tallest form, FIGS. 23a and 23b, are formed from a mating pair of the same extrusion parts as shown in FIG. 17 and can accommodate a square or a horizontally disposed glass block 13. The fixtures of FIGS. 21 and 22 are produced using a single closed extrusion and are particularly adapted to receive vertically oriented glass blocks 13.

Figures 1, 1B, 19:
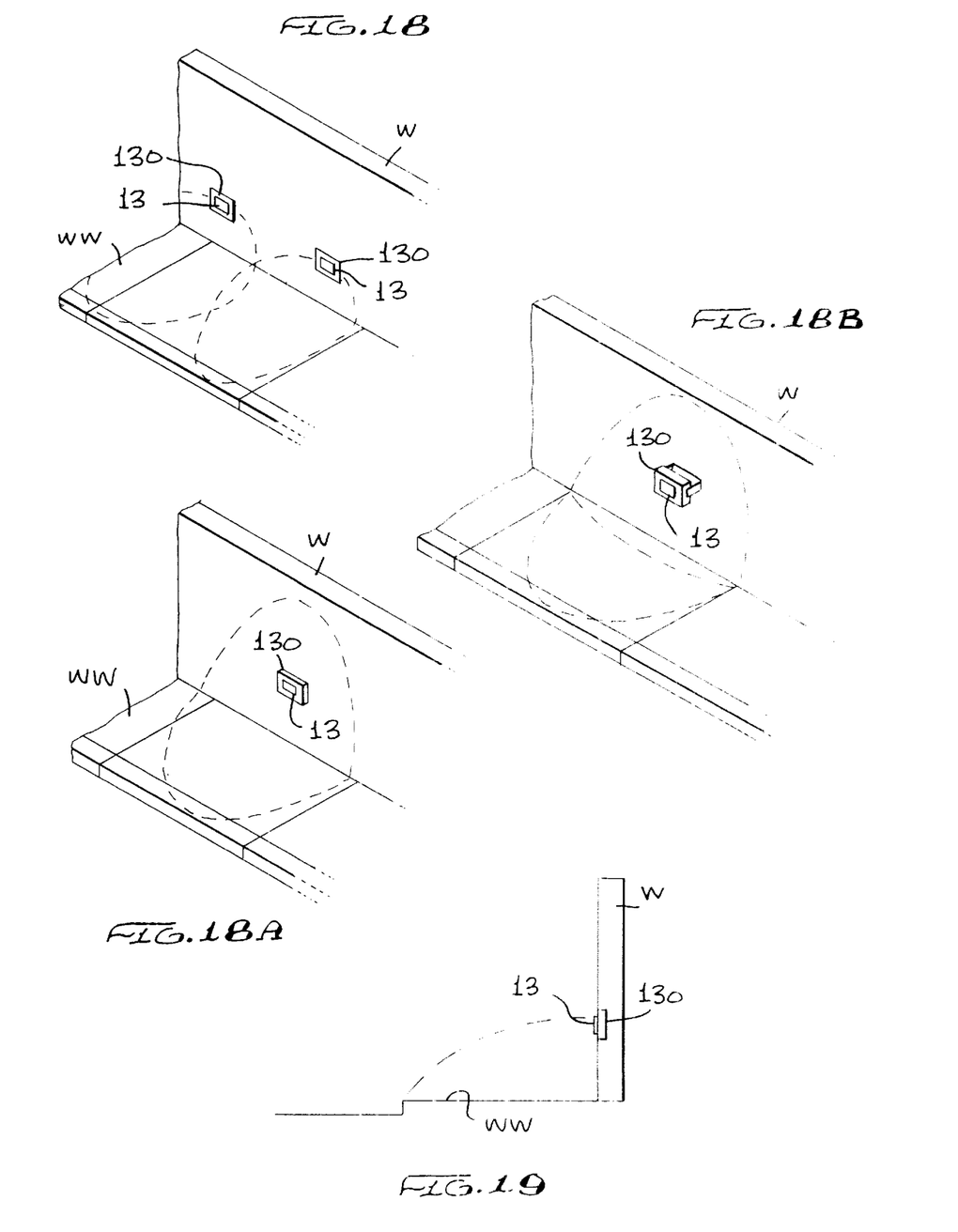
FIG. 19 is a vertical sectional view through the wall of FIG. 18 showing the fixture of FIG. 18 and its horizontal light distribution pattern.

In addition to bollard or freestanding fixtures, this invention may be applied equally well in other forms of mounts. FIGS. 18 and 19 show wall mounting and typical light distribution patterns shown as the curved lines surrounding the fixture. When the fixtures 130 are mounted in a wall W, which borders a walkway WW, the pattern intersects a short distance from the wall. When the fixture is placed away from the wall, the coverage is more complete. If a double-sided fixture, as is used in bollards described above, is mounted a distance outward from the wall, walkway lighting as well as wall washing illumination is possible in accordance with this invention.

IN SUMMARY

To summarize, my invention involves a series of lighting fixtures which use a glass block or brick as a lens, where the major faces are used as the light-emitting surfaces, and the other sides or edges are used either as reflectors of a clear or translucent surface or receiving light from a light source. The light source may be any of a number of types, incandescent, HID, tungsten halogen, fluorescent, LED or other type. Light from the lamp is introduced into the block and emitted out of large, decorated or plain front and rear sides of the glass block.

A series of fixtures and products range from bollard type, wall mounted, well light (in ground), and ceiling mounted applications. Etching the glass lens allows for unusual signage incorporated into the fixture.

Advantages of using the glass block as the fixture lens are:
1. The structure of the hollow body, cube or brick shape allows for a pleasing unusual appearance while reducing glare from the lamp source and allowing the user to see through the lens thereby illuminating all the colors and shapes surrounding the fixture. This makes for a mystical appearance unlike any lighting fixtures on the market today.
2. The glass block is permanently sealed during manufacture in a high temperature, low humidity environment that eliminates moisture permanently on the inside of the lens glass wall. Moisture elimination within an outdoor fixture is a constant challenge for the fixture designer and the user.

3. The glass block lens is of very durable construction being originally designed for structural use, it is also designed to stand the rigors of human interface.

4. There is a wide selection of block styles and one can increase the selection by etching or sandblasting designs into the face of the blocks and the image is backlit by the direction of the lamp transmission. It should be clear that the glass block can be etched with letters, words, symbols, numerals or directional arrows which produces a pleasing back lit sign.

5. Colors can be incorporated into the lens block or color filters or dichroic filters can be places between the lamp and the glass block lens creating a further custom look to the product.

6. The glass block as a fixture lens is also totally compatible with use of extruded or otherwise fabricated housing in dimensions matching the glass block thickness for dual direction illumination. The edges of the glass block are directly usable as a light diffuser and entry surface and when reflectively finished as internal reflectors.

The foregoing embodiments are illustrative of this invention and are not to be considered as limiting. Instead, the scope of this invention is to be measured by the claims allowed including the benefit of the Doctrine of Equivalents.

I claim:

1. A lighting fixture comprising:
   a upstanding housing having at least one opening on one side;
   a lamp in said housing;
   wiring in said housing connecting a source of electrical energy to said lamp;
   a sealed structural glass block in said housing having a plurality of exterior surfaces with one surface directed toward said opening; and
   said lamp being directed toward another of said exterior surfaces of said glass block for introducing light into the sealed interior of said glass block for emission of light from the fixture.

2. A lighting fixture as claimed in claim 1 wherein said glass block has two opposing face surfaces and a plurality of said exterior edge surfaces, one of said opposing face surfaces is directed toward said opening, one of said exterior edge surfaces is light conductive and faces said lamp, and the other exterior edge surfaces are coated with a light-reflecting material,
   whereby one of said face surfaces emits light from said fixture, said light conducting exterior edge surface introduces light into said glass block and said other exterior edge surfaces reflect light back into said glass block.

3. A lighting fixture as claimed in claim 2 wherein said housing has a second opening on the opposite side from said first opening and said glass block has a second face surface facing said second opening.

4. A lighting fixture as claimed in claim 1 wherein said glass block includes light-emitting walls and said light-emitting walls are ornamented.

5. A lighting fixture as claimed in claim 4 wherein the ornamentation of said light-emitting walls is chosen to provide a desired illumination pattern.

6. A lighting fixture as claimed in claim 1 wherein said glass block is positioned in and extends slightly beyond said opening.

7. A lighting fixture comprising:
   a housing of generally rectangular cross-section having a pair of openings on opposite sides thereof;
   a lamp in said housing;
   wiring in said housing for connecting a source of electrical power to said lamp, and
   a sealed glass block in said housing having a pair of oppositely directed face surfaces facing said openings and a plurality of edge surfaces, one of said edge surfaces facing said lamp for introducing light into the sealed interior of said glass block.

8. A lighting fixture as claimed in claim 7 wherein said housing includes a plurality of internal fastener grooves and a bracket secured to said fastener grooves for supporting said glass block in said housing.

9. A lighting fixture as claimed in claim 7 wherein said edge surfaces not facing said lamp are coated with light-reflecting material.

10. A lighting fixture as claimed in claim 7 wherein said glass block is partially transparent.

11. A lighting fixture as claimed in claim 7 wherein said housing has a cover and said lamp is mounted within said housing adjacent said cover.

12. A lighting fixture as claimed in claim 8 wherein said housing is formed of a pair of identical extruded parts which are interlocked to form a rectangular cross section.

13. A walkway light comprising:
    a housing including an opening in one face thereof;
    a hollow glass block secured within said housing with one face positioned in said housing for emission of light from said housing through the opening in said housing;
    lamp means within said housing directed to introduce light into the hollow interior of said glass block;
    said glass block having a light transmitting surface exposed to said lamp;
    means for introducing power into said housing for illuminating said lamp; and
    means for mounting said housing adjacent to a walkway.

14. A walkway light in accordance with claim 13 wherein said means for mounting said walkway light includes bracket means for securing said walkway light to a support adjacent to a walkway.

15. A lighting fixture as claimed in claim 13 wherein said housing is embedded in a wall adjacent to a walkway and power is supplied to said power-introducing means through said wall.

16. A lighting fixture as claimed in claim 13 wherein said housing is generally rectangular with a major face defining said opening as rectangular in shape;
    and wherein said glass block is rectangular in shape including four edges within said housing;
    three of said edges of said block being substantially light reflective; and
    the fourth edge being substantially light transmissive and directed toward said lamp means for introducing light into said glass block.

17. A walkway light in accordance with claim 13 wherein said one face of said glass block is ornamented to provide directional information.

18. A lighting fixture as claimed in claim 15 wherein said glass block is positioned in and extends slightly beyond said opening.

* * * * *